Patented Oct. 18, 1949

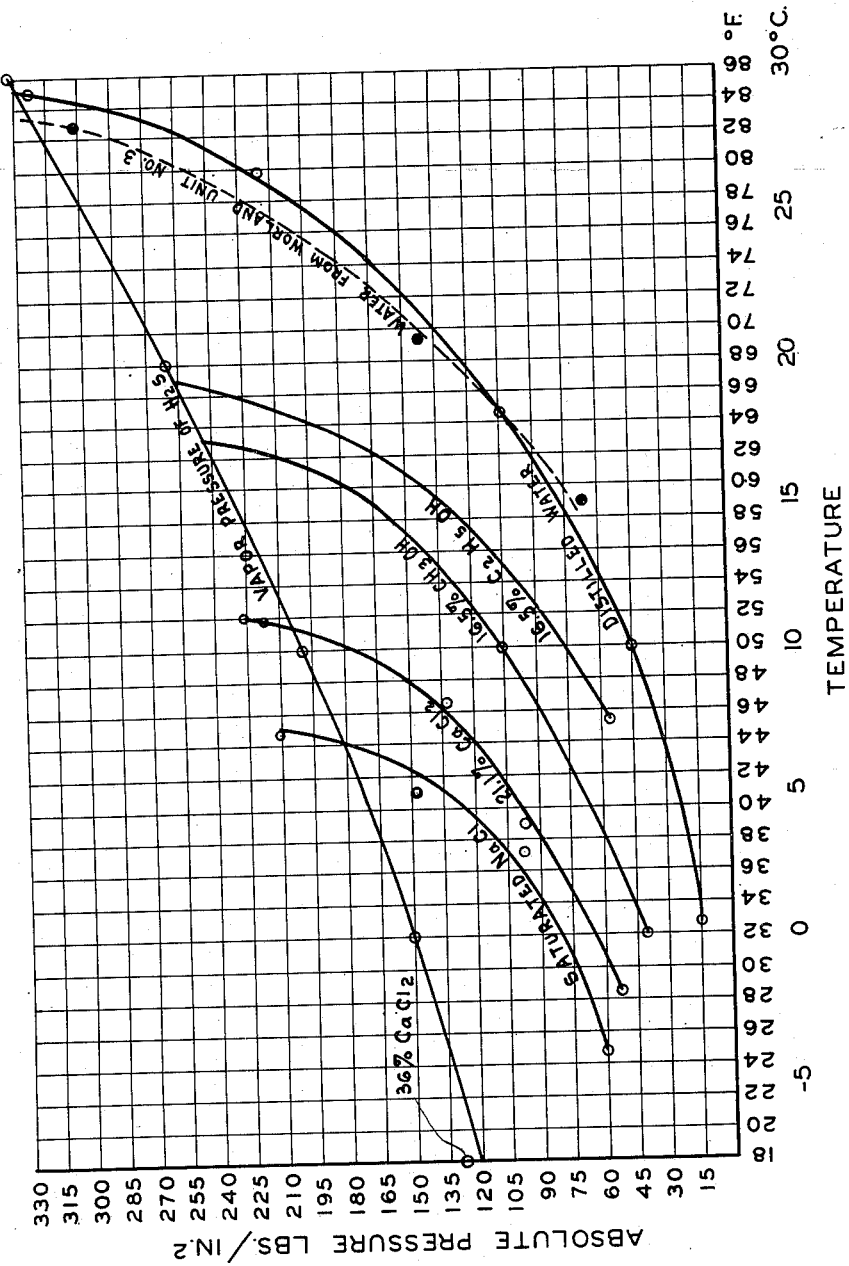

2,485,231

UNITED STATES PATENT OFFICE 2,485,231

DRILLING WELLS THROUGH FORMATIONS WHICH PRODUCE GAS CONTAINING LARGE AMOUNTS OF HYDROGEN SULFIDE

Donald C. Bond, Northbrook, Nelson B. Russell, Winnetka, and George G. Bernard, Chicago, Ill., assignors to The Pure Oil Company, Chicago, Ill., a corporation of Ohio Application November 15, 1947, Serial No. 786,312

8 Claims. (Cl. 252—8.55)

This invention relates to the drilling of earth bores and is more particularly concerned with a method of drilling wells through formations which produce gas containing large amounts of hydrogen sulfide.

In some oil and gas producing fields, as for example the Worland field in Wyoming, the producing formations contain hydrocarbon gas mixed with large amounts of hydrogen sulfide. In the Worland field, gas produced from finished wells will contain between 25 and 30 mole % of hydrogen sulfide. It is found that when wells in such producing areas go on production, they quickly clog or freeze up causing stoppage of oil and gas flow. Great difficulty is experienced in opening the wells after they have become frozen.

It has been found that the freezing or clogging up of wells in formations producing gas of high hydrogen sulfide content is caused by formation of solid hydrogen sulfide hydrate, having the probable formula $H_2S \cdot 6H_2O$, in the upper and cooler portion of the well bore.

The object of this invention is to provide a method for drilling wells in formations which produce gas of high hydrogen sulfide content which will enable such wells to start production without freezing or clogging.

Other objects of the invention will become manifest from the following description and drawing of which the single figure is a chart showing the equilibrium curves for solid hydrogen sulfide hydrate with various solutions.

In accordance with our invention, during the drilling of a well in a formation where gas rich in hydrogen sulfide is encountered, aqueous fluid is introduced into the well bore during the drilling operation, in the manner customary in conventional rotary drilling operations. However, the aqueous drilling fluid, in accordance with our invention, contains enough antifreeze reagent to lower the temperature at which solid hydrogen sulfide hydrate will form so that this temperature is below any temperature which is encountered in the well.

Solid hydrogen sulfide hydrate will form when hydrogen sulfide is mixed with distilled water at temperatures up to 85° F. provided the partial pressure of hydrogen sulfide is high enough. Above 85° F. solid hydrogen sulfide hydrate does not form and any hydrate which has been formed will be decomposed above this temperature. In earth bores the temperature becomes progressively higher the deeper the well. For example, in the Worland field in Wyoming temperature of the earth bores at approximately 10,000 feet is approximately 232° F. and the pressure is approximately 4,250 pounds per square inch. No difficulty is experienced at the bottom of the well on account of solid hydrogen sulfide hydrate formation. However, at a point approximately 3,000 feet from the surface, the temperature drops to approximately 85° F., but the pressure is still in excess of 2,000 pounds per square inch, with the result that freezing occurs in the bore between that point and the earth's surface. Temperature in the well bore may be considerably lower than the temperature of the rock formation around the bore because of the refrigeration effect resulting from the expansion of the gas as it passes up the hole.

During drilling operations with aqueous drilling muds, water from the drilling mud infiltrates through the wall of the well bore into the surrounding formations. As a result, when the well goes on production this water which has permeated the walls of the earth bore flows back into the earth bore together with the oil and gas from the producing formation. This water in the presence of the hydrogen sulfide forms solid hydrogen sulfide hydrate under proper conditions of temperature and pressure.

We have discovered that by adding antifreeze reagents to the aqueous drilling fluid used during the rotary drilling of the well, the maximum solid hydrogen sulfide hydrate-forming temperature can be lowered below the lowest temperature encountered in the well bore, and no difficulty from freezing or clogging of the well is experienced during initial production of the well. Various substances which may be electrolytes or non-electrolytes may be used as antifreeze agents. Soluble metal salts are particularly effective. Calcium chloride is one of the best antifreeze agents from the viewpoint of lowering temperature. However, ordinary sodium chloride is cheaper and may be used where climatic conditions are such that temperatures at the surface of the well are not substantially below 32° F. Non-electrolytic type antifreeze reagents, such as the lower boiling mono- and di-hydroxy alcohols, including methyl alcohol, ethyl alcohol, isopropyl alcohol, isobutyl alcohol, ethylene glycol and diethylene glycol may be used. When using non-electrolytic type antifreeze agents, it may be advisable to incorporate in the drilling fluid sufficient electrolytic type antifreeze to lower the resistivity of the drilling fluid to about the same value of average resistivity of the rock formation through which the bore is drilled in order to make it possible to obtain good electrical logs of the well during the drilling operation. Thus, the drilling fluid may contain a mixture of ethyl or methyl alcohol with either calcium or sodium chloride.

In addition to antifreeze reagents a corrosion inhibitor may be added to the drilling fluid in order to inhibit corrosion of the well tubing and casing during the drilling operation and when production of the well begins. Various corrosion inhibitors which inhibit corrosion of steel by brine and hydrogen sulfide, such as polyhydroxy phenols and substances containing polyhydroxy phenolic compounds including pyrogallol, tannic acid, hydroquinone, phloroglucinol, monoethyl ether of pyrogallol and hard wood tar fractions boiling between 200° and 340° C., are useful. Likewise, the alkali reaction products of the foregoing compounds and substances are excellent corrosion inhibitors. Cyclic nitrogen compounds containing a tertiary nitrogen atom in the ring, such as pyridine, quinoline, methylpyridines, methylquinolines, and their salts are also good corrosion inhibitors. Formaldehyde also inhibits corrosion. The various corrosion inhibitors may be added to the drilling fluid in an amount between one to ten parts per 10,000 parts of drilling fluid.

Where a metal salt is used as the electrolyte in sufficient quantity to give the mud the requisite specific gravity, the brine itself may be used as the drilling fluid, but where the weight of the drilling fluid is insufficient to provide the necessary head in the well, clay, bentonite, or other mud-producing earths may be added to provide a drilling mud of proper weight, and if necessary weighting agents such as barites may be incorporated. It may be necessary when mixing soluble metal salts with drilling mud to add starch or gummy materials to maintain a proper mud suspension as well as deflocculating agents such as tannins or complex phosphates such as sodium hexametaphosphate.

Although our invention is designed primarily to prevent freezing or clogging of earth bores, it is within the scope of our invention to also prevent clogging or freezing of pipe lines from the well casing head to storage tanks through which the gas produced in the well must flow. Unless heating means are supplied for maintaining pipe lines above the temperature of solid hydrate formations, it is advisable to add sufficient antifreeze to the drilling fluid so that solid hydrate will not form at the lowest temperature to which the pipe lines are subjected.

In order to give a clear picture of the effectiveness of various antifreeze reagents in lowering the temperature above which solid hydrogen sulfide hydrate will not form, a graph is shown in the drawing with equilibrium curves for saturated aqueous sodium chloride solution, 21.1% calcium chloride, 16.5% methyl alcohol and 16.5% ethyl alcohol, water from a well in the Worland field, and distilled water. The abscissae are indicated both in degrees Fahrenheit and degrees centigrade. The ordinates indicate partial pressure of hydrogen sulfide in pounds per square inch. The vapor pressure curve for hydrogen sulfide at various temperatures has also been shown in the chart. By referring to the chart, it will be seen that the various curves for the different solutions intersect the hydrogen sulfide vapor pressure curve. These points of intersection mark the highest temperature at which solid hydrogen sulfide hydrate formed by the mixture of hydrogen sulfide and the particular solutions can exist indefinitely at any pressure. At temperatures above the temperature of the point of intersection, solid hydrogen sulfide hydrate decomposes, regardless of the partial pressure of the hydrogen sulfide.

At temperatures and pressures below and to the right of the curve for a given solution, solid hydrogen sulfide hydrate will not form. In this region liquid water containing dissolved hydrogen sulfide, and gaseous hydrogen sulfide are in equilibrium with one another. At points along the curve of the particular solution, that solution contains dissolved hydrogen sulfide in equilibrium with solid hydrogen sulfide hydrate and gaseous hydrogen sulfide. In the area between the hydrogen sulfide vapor pressure curve and the curve for a particular solution, to the left of the latter curve, solid hydrogen sulfide hydrate exists in equilibrium with gaseous hydrogen sulfide. For pure water, at points along the portion of the hydrogen sulfide vapor pressure curve bordering this area, solid hydrogen sulfide hydrate and liquid hydrogen sulfide are in equilibrium.

It is not possible to obtain equilibrium at points above the vapor pressure curve for hydrogen sulfide since the pressure is automatically lowered to the vapor pressure of hydrogen sulfide by condensation of hydrogen sulfide to the liquid state. It is possible, however, to obtain meta-stable conditions as shown by the portions of the curves for saturated sodium chloride and 21.1% calcium chloride extending above the hydrogen sulfide vapor pressure curve.

In the following table there is given a comparison between the lowering effect of sodium chloride, calcium chloride, methyl alcohol and ethyl alcohol of the maximum temperature at which solid hydrogen sulfide hydrate can exist in equilibrium with an aqueous solution containing the several reagents.

TABLE I

*Lowering of $T_M$*

[$T_M$=maximum temperature at which solid $H_2S$ hydrate can exist in equilibrium with given solution.]

| Antifreeze | Lowering of $T_M$ per mol per liter of solution | | Relative lowering on molar basis | Lowering of $T_M$ per lb. per gallon of solution | | Relative lowering on wt. basis |
|---|---|---|---|---|---|---|
| | ° F. | ° C. | | ° F. | ° C. | |
| Sodium Chloride | 7.7 | 4.3 | 1.00 | 15.7 | 8.8 | 1.00 |
| Calcium Chloride | 13.3 | 7.4 | 1.71 | 14.3 | 8.0 | 0.91 |
| Methyl Alcohol | 4.4 | 2.5 | 0.57 | 16.9 | 9.5 | 1.08 |
| Ethyl Alcohol | 5.2 | 2.9 | 0.68 | 14.0 | 7.8 | 0.89 |
| Ethylene Glycol | 5.6 | 3.1 | 0.73 | 10.9 | 6.1 | 0.69 |
| Diethylene Glycol | 5.6 | 3.1 | 0.73 | 6.4 | 3.6 | 0.41 |

From a study of the table it will be seen that on a mol basis, calcium chloride gives the greatest lowering effect. On a pound per gallon basis, methyl alcohol is the best. On a weight basis the first four reagents do not differ greatly.

Although sodium chloride is the cheapest reagent to use, it will be seen from the drawing that calcium chloride, because of its greater solubility in water, is capable of giving a greater lowering of the maximum temperature at which solid hydrates are formed. Note that a saturated solution of calcium chloride (36% of calcium chloride) lowered the maximum temperature at which the solid hydrate will form to 18° F.

It is also interesting to note from the chart that the water from a well (unit #3 in the Worland field) had a slightly lower $T_M$ than distilled water. This was as expected since the water from this well contained approximately 1% of salt.

Curves similar to those shown in the drawing can be prepared for any particular solution by making freezing point determinations of a sufficient number of points at different pressures to enable a curve to be drawn through the points. From the curve the solid hydrogen sulfide hydrate forming temperature for any particular solution can be determined at any given pressure. After determining the lowest temperature existing in the well bore and at the surface of the earth at the well location, a drilling fluid can be prepared which will have a maximum solid hydrogen sulfide hydrate forming temperature below the lowest temperature to be encountered in the well, and, if desired, at the surface of the earth. This solution can then be used as the drilling fluid with or without the addition of clay or other mud-producing material, weighting agents and various other constituents which are desired to give desired properties to the drilling fluid.

It is within the scope of our invention to inject into the pipe line leading from the well casing head to storage tanks, a solution containing an antifreeze reagent different from that used in the drilling operation. For example, in extremely cold weather, the use of sodium or calcium chloride may be satisfactory for use in the drilling mud to prevent freezing in the well bore but may not depress the maximum hydrogen sulfide hydrate temperature below the atmospheric temperature. In such cases an aqueous solution containing a high proportion of methyl alcohol, ethyl alcohol, ethylene glycol or diethylene glycol may be injected into the pipe line when the well goes on production. By using solutions of high enough concentration, the maximum temperature for solid hydrate formation can be depressed below the lowest atmospheric temperature encountered. For example, a 72.8% by weight ethylene glycol solution was cooled to −30° F. and stirred for five hours at this temperature in the presence of liquid hydrogen sulfide without formation of solid hydrogen sulfide hydrate. A 95% by weight diethylene glycol solution was cooled to −40° F. and stirred for seven hours in the presence of liquid hydrogen sulfide without formation of solid hydrogen sulfide hydrate. Means will have to be provided for recovering and concentrating such solutions since they will gradually become diluted with water from the producing formation.

The necessity for using antifreeze reagent in the pipe lines can be avoided by suitably insulating such lines or providing heated jackets therefor.

What is claimed is:

1. In the rotary drilling of earth bores through formations which produce gas containing hydrogen sulfide in sufficient amounts to form solid hydrates in the well bore, the step of circulating into and out of the bore during the drilling operation aqueous drilling fluid containing a water soluble freezing point depressor in an amount at least equal to that required to depress the maximum hydrogen sulfide hydrate-forming temperature below the lowest temperature encountered in the well bore.

2. The step in accordance with claim 1 in which the antifreeze is a water soluble salt.

3. The step in accordance with claim 1 in which the antifreeze is a low-boiling alcohol.

4. The step in accordance with claim 1 in which the antifreeze is sodium chloride.

5. The step in accordance with claim 1 in which the antifreeze is calcium chloride.

6. The step in accordance with claim 1 in which the antifreeze is methyl alcohol.

7. A method for preventing freezing of earth bores in formations producing gas containing hydrogen sulfide in sufficient amount to form solid hydrates during rotary drilling thereof with an aqueous drilling mud comprising determining the temperature and pressure conditions existing along the length of the well bore and adding to the drilling mud an amount of a water soluble freezing point depressor at least equal to the amount required as shown by equilibrium curves for the particular freezing point depressor to prevent solid hydrogen sulfide hydrate formation at any point in the well bore.

8. The step in accordance with claim 7 in which the freezing point depressor is adjusted to lower the resistivity of the drilling fluid to approximately the value of the rock formation being drilled.

DONALD C. BOND.
NELSON B. RUSSELL.
GEORGE G. BERNARD.

REFERENCES CITED

The following references are of record in the file of this patent:

UNITED STATES PATENTS

| Number | Name | Date |
| --- | --- | --- |
| 2,024,718 | Chamberlain | Dec. 17, 1935 |
| 2,073,413 | Cross | Mar. 9, 1937 |
| 2,191,312 | Cannon | Feb. 20, 1940 |
| 2,371,955 | Dawson | Mar. 20, 1945 |